Jan. 24, 1967  J. A. FINNERTY  3,300,270
MAGAZINE-LOADED PROJECTOR FOR MOTION PICTURES
Filed Dec. 8, 1964  3 Sheets-Sheet 1

INVENTOR.
JOHN A. FINNERTY
BY
Kenway, Jenney & Hildreth

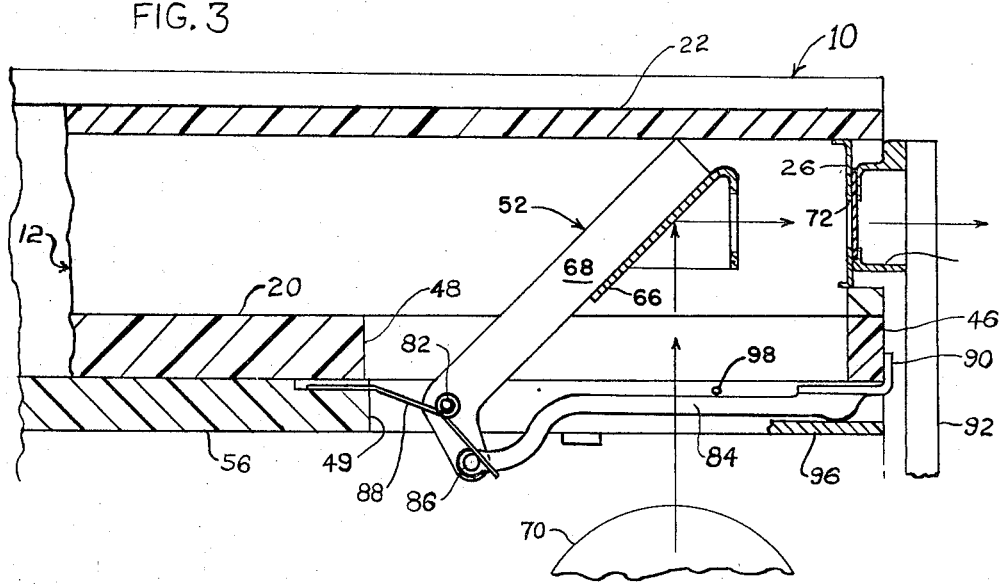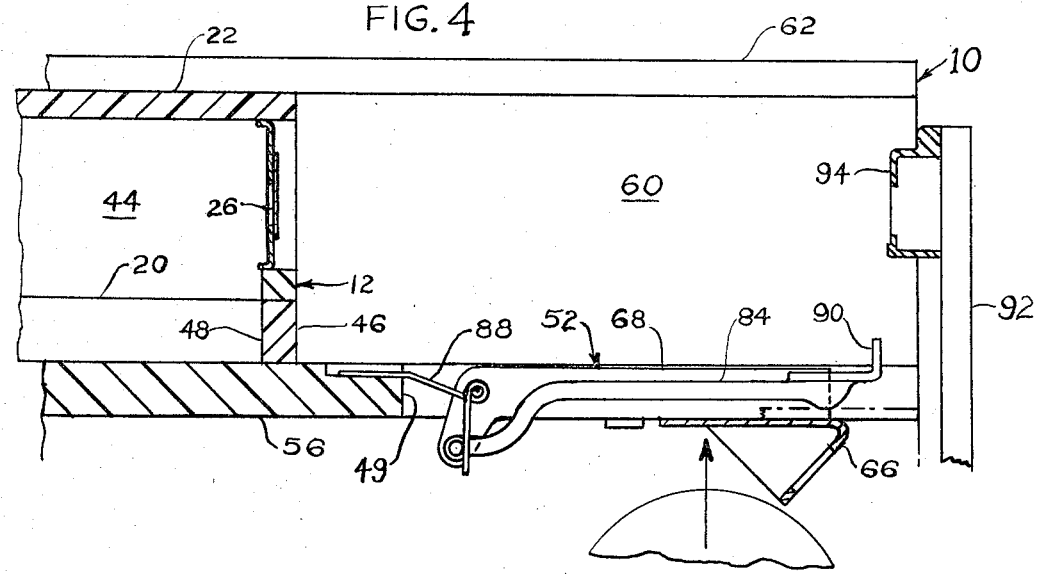

INVENTOR.
JOHN A. FINNERTY

United States Patent Office 3,300,270
Patented Jan. 24, 1967

3,300,270
MAGAZINE-LOADED PROJECTOR FOR MOTION PICTURES
John A. Finnerty, Waban, Mass., assignor to See-Sonics, Inc., Brockton, Mass, a corporation of Massachusetts
Filed Dec. 8, 1964, Ser. No. 416,704
4 Claims. (Cl. 352—29)

This invention relates to a magazine-loaded projector for motion pictures, and has as its primary object the provision of an improved projector and cooperating film magazine by means of which an endless coil of film may be projected without handling. It is a further object to enable an operator with a single motion, to load a film magazine and prepare the apparatus for projection of the film, without any further adjustment or manipulation.

The improved projector is useful for both sound and silent movies. In either case, it is necessary to pass a light beam from a projection lamp through the magazine to the film, and thence through a projection aperture and out of the magazine to a shutter and lens. An analogous need exists where a sound pick-up head is to be brought into operative relation with the film. A disadvantage of many previously known magazine projectors is the complex structure required to position light and sound instrumentalities in cooperative relation with the magazine to project the film, and then to withdraw them so the magazine can be removed. It is a specific object of the present invention to provide an improved projector in which a magazine is assembled, and image and sound projection faculties are brought into operative relation with the film, all by a single inserting movement of the magazine into the projector. Further objects and advantages of the invention will become apparent as the following description proceeds.

A preferred embodiment of the invention includes a magazine in the general form of a rectangular parallelepiped, and a projector having a plane guide surface which terminates laterally in parallel guide channels. These channels receive the magazine for rectilinear sliding assembly or disassembly in the projector. The assembled position is defined by an upstanding abutment wall at the forward end of the guide surface, which engages a forward wall of the magazine.

A projection lamp is mounted internally in the projector, and the guide surface has a light opening which registers with a corresponding opening in the magazine wall when the two are fully assembled. A reflector is pivotally mounted in the guide surface opening, and is withdrawn into this opening by a spring to clear the magazine while the latter is being inserted or removed. Finally, a linkage is drivingly connected with the reflector, and is engageable by the magazine as it approaches the end of the inserting movement, to drive the reflector outwardly from the guide surface through the mating magazine opening, and into a position to reflect the projection light beam forwardly through the film to a projection aperture. When the operator commences to withdraw the magazine, the linkage is released and the spring withdraws the reflector into the projector so that it does not interfere with the continued withdrawal of the magazine.

For application to sound movies, a sound pick-up head is mounted and actuated in a similar manner, being movable by a magazine-actuated linkage from a retracted position within the projector, to an extended position operatively engaged in the magazine. The sound head and reflector may be actuated by a common linkage, although in view of different degrees of angular movement which may be required of these elements, simplicity of the mechanism may be attained more readily by using separate linkages.

While the specification concludes with claims particularly pointing out the subject matter which I regard as my invention, it is believed that a clearer understanding may be gained from the following detailed description of a preferred embodiment thereof, referring to the accompanying drawings, in which;

FIG. 3 is a fragmentary sectional view taken along line 3—3 in FIG. 1;

FIG. 4 is a fragmentary view taken along line 4—4 in FIG. 2;

Figure 1:
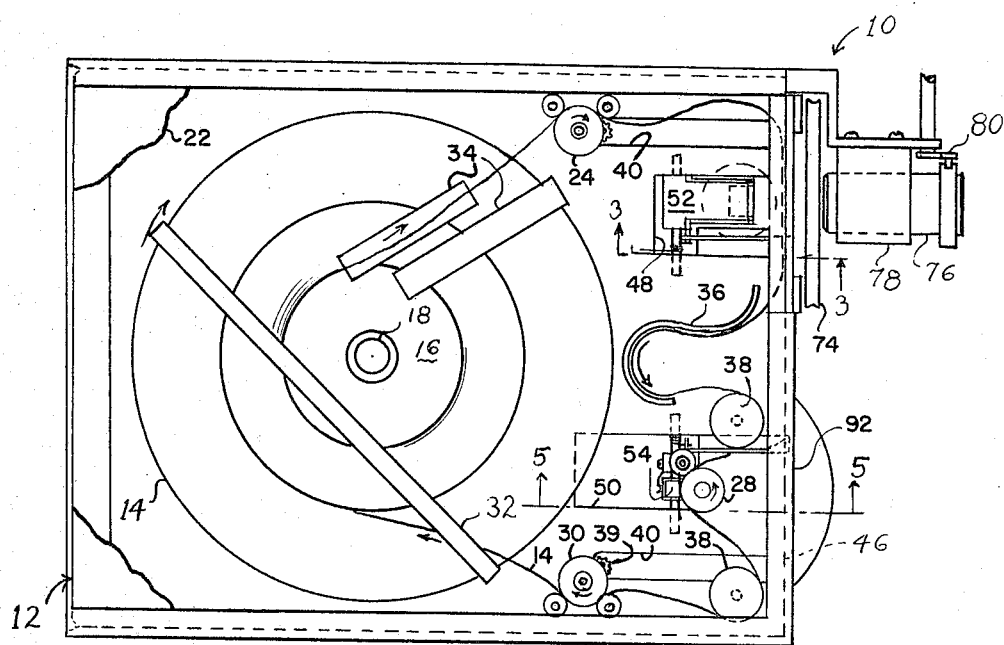
FIG. 1 is a fragmentary view in side elevation showing a preferred embodiment of the projector with the magazine assembled in position for projecting the film.
Figure 2:
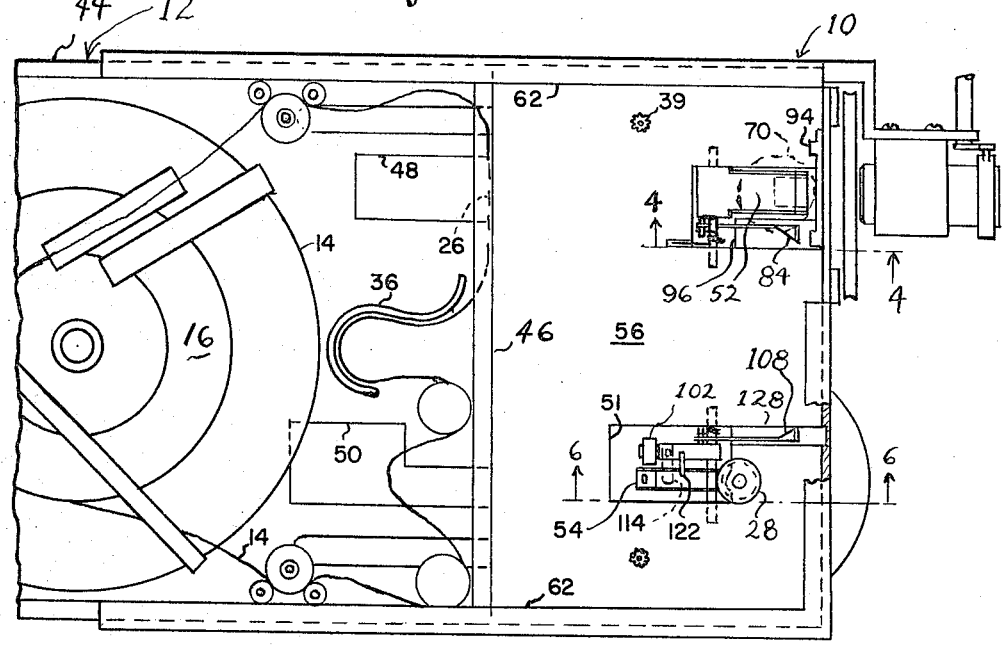
FIG. 2 is a view similar to FIG. 1, but showing the magazine partially removed.

Referring to the drawings, the improved projector is generally indicated at 10, and slidably receives a magazine 12 for reproducing visual recordings from an endless coil of film 14. In the form shown, the projector is also adapted to reproduce sound from a track recorded on the film. The film is wound in an endless coil on a reel 16, which is rotatably supported by means of a shaft 18 journaled in opposite side walls 20 and 22 of the magazine. The film is drawn from the interior of the coil serially to a drive sprocket 24, a projection gate 26, a sound pick-up head 54 and a cooperating drive spindle 28, and a second drive sprocket 30, and is then returned to the outer periphery of the coil. Guide strips 32 and 34 are affixed to the wall of the magazine for directing the film into the proper paths. A guiding wall segment 36 of sinuous form serves to extend the film in a free loop as it passes from the film gate to the sound pick-up head, and the film is guided by free-wheeling idlers 38 about the spindle 28. The projector includes motive means (not shown) for driving the sprockets 24 and 30 through pinions 39, which are received in longitudinal channels 40 formed in the side wall 20 to permit assembly and disassembly of the magazine. The spindle 28 is driven through a spud connection (not shown) with a drive shaft 41 terminating at the side wall 20.

Figure 6:
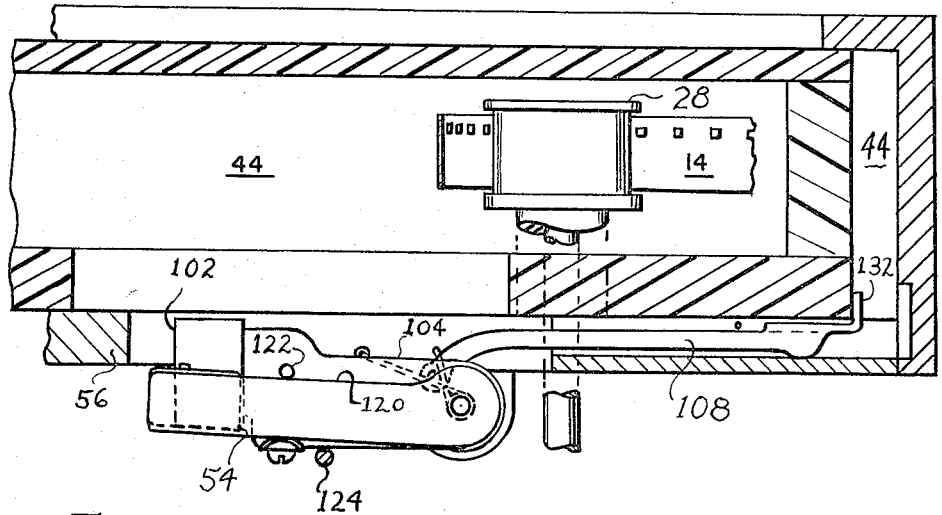
FIG. 6 is a fragmentary sectional view taken along line 6—6 in FIG. 2.

The housing of the magazine 12 comprises, in addition to the side walls 20 and 22, connecting edge walls 44 and a forward wall 46. A reflector opening 48 and a sound head opening 50 are formed in the side wall 22, in position to receive a reflector 52 and a sound head 54, respectively, in the assembled position of FIG. 1. As shown in FIGS. 4 and 6, when the magazine is removed the reflector 52 and sound head 54 are withdrawn into coincident openings 49 and 51, respectively, formed in a guide wall 56 of the projector. The magazine is guided rectilinearly in the assembling movement by sliding cooperation between the guide wall 56 and the side wall 20, and also by sliding cooperation between the parallel edge walls 44 of the magazine and parallel guide channels or walls 60 of the projector, which extend into lateral flanges 62. The projector thus affords a substantially parallelepiped recess into which the mating form of the magazine is rectilinearly slidable.

The mechanisms by which the reflector 52 and the sound head 54 are actuated will now be described. Referring particularly to FIGS. 1–4, the reflector comprises a reflecting element 66 mounted on a bell-crank lever 68. The reflector, in the extended position shown in FIGS. 1 and 3, reflects light beams from a lamp 70, mounted interiorly of the projector, through an aperture 72 formed in a projection gate 26. The light beam, having passed through the film in the gate, is transmitted to a conventional rotary shutter 74 and a projection lens 76, the latter being adjustably mounted on the projector by a sleeve bracket 78, and having a focusing crank 80.

The lever 68 is pivoted on a pin 82 in the guide wall 56, and is drivingly connected with an actuating link 84 by means of a pin 86. The lever is angularly biased toward a retracted position shown in FIG. 4 by means of a hair-pin springs 88. Withdrawal of the magazine permits the spring to retract the reflector, drawing the lever rearwardly to position an upstanding lip 90 in the assembly path of the magazine. The projector has an upstanding abutment or wall 92 extending transversely from the forward end of the guide wall 56, and bearing a locating element 94 for abutment with the gate 26 in the assembled position. The reflector 52 remains initially in the withdrawn position at the commencement of insertion of the magazine, and is actuated only as the insertion is completed, by the interference of the magazine wall 46 with the lip 90. This delay is necessary to permit the rising reflector to clear the magazine opening 48.

The link 84 is reciprocably guided by a supporting plate 96 mounted in the opening 49 of the guide wall 56, and is prevented from rising out of he opening by a transverse retainer pin 98. Withdrawal of the magazine immediately permits the spring 88 to draw the lever 84 rearwardly and thus withdraw the reflector to the retracted position. To hold the magazine in the assembled position against the spring bias, frictional engagement with the projector may be relied on; or detent means (not shown) may be provided.

Figure 5:
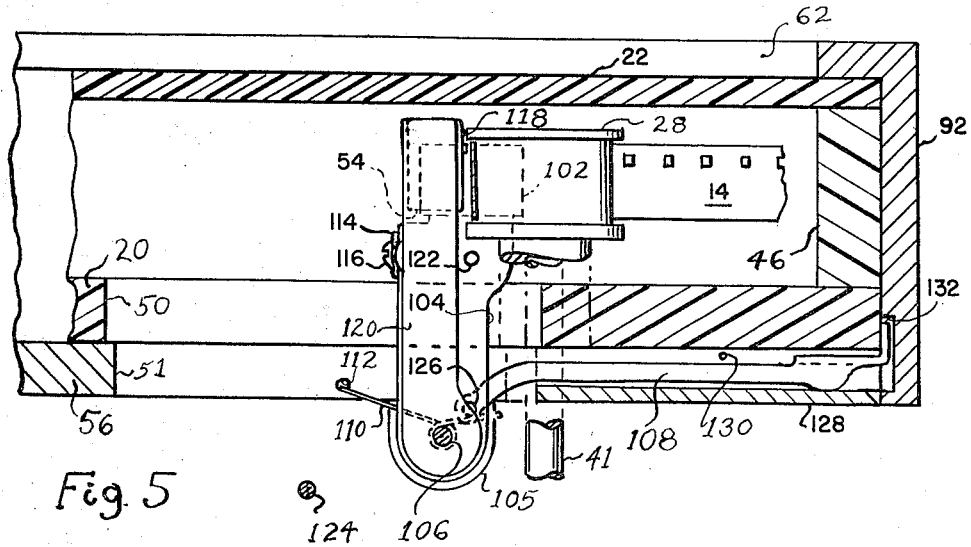
FIG. 5 is a fragmentary sectional view taken along line 5—5 in FIG. 1.

The sound head 54 is actuated by means of a similar linkage, as shown in FIGS. 5 and 6. In this instance, an idler roller 102 is mounted on an arm 104 for movement by a sliding lever 108 between a retracted position withdrawn into the opening 51 of the guide wall 56 as shown in FIG. 6, and an extended position in which the roller engages the spindle 28 peripherally to position the film 14 properly, as shown in FIG. 5. The linkage is pivoted in an ear 105 by a pin 106, and is biased toward the retracted position by a hair-pin spring 110 bearing on the arm 104 and having its opposite end fixed in an opening 112 in the wall 56. The sound head 54 is not directly driven by the lever 108, but is mounted on an arm 120, which is resiliently actuated through a leaf spring 114 fastened to the arm 104 by a machine screw 116. The operating position of the sound head is determined by the abutment of a button 118 against the periphery of the spindle 28. As the pick-up assembly is withdrawn, the arm 120 comes to rest against a stop pin 122 extending from the arm 104. The entire pick-up assembly is arrested in the retracted position by means of a stop 124 mounted in the projector.

The lever 108 is pivotally connected to the arm 104 at 126, and it is reciprocably guided by a plane support 128 mounted within the opening 51. A retaining pin 130 prevents escape of the lever from its channel. Actuation of the lever is obtained by means of a lip 132 which engages with the forward wall 46 of the magazine as it is pushed home.

In the embodiment shown, the sound head and the reflector are operated by separate linkages; however, it should be understood that they may be actuated by a common linkage if desired. The different degrees of angular movement required of these elements may suggest the use of separate linkages to avoid mechanical complexity, as in the illustrated embodiment. However, a common linkage may be used to bring about the different degrees of angular movement, as, for example, by means of a rack and pinions of suitable ratio. Further modifications will occur to those skilled in the art without departing from the true spirit and scope of the invention, which I therefore intend to define in the appended claims without limitation to the details of the preferred embodiment which has been illustrated and described.

What I claim is:

1. A magazine-loaded projector for motion pictures comprising, in combination:

a magazine having a general form of a rectangular parallelepiped, having a plane side surface, and a forward wall and parallel edge surfaces each extending transversely to said side surface; said housing defining an enclosure for an endless coil of film, and having a first opening said side surface rearwardly of said forward wall; said forward wall being provided with a projection aperture, and extending continuously between said edge surfaces and enclosing said film against mechanical damage; said magazine further including means for feeding the film past said aperture and entirely interiorly of said housing;

and a projector including a reproducing element for cooperation with said film, and drive means for said film-feeding means; said projector being formed with a plane guide surface terminating at a forward end in abutment means protruding upwardly therefrom; said guide surface terminating laterally in parallel guide channels to receive the edge surfaces of said magazine for rectilinear sliding movement of said magazine longitudinally over said guide surface to and from an assembled position for film projection, in which said forward wall abuts said abutment means;

said guide surface being formed with a second opening aligned with said first opening in the assembled position of said magazine; said reproducing element being pivotally mounted in said second opening, for advancement to an extended position protruding from said second opening and said guide surface and extending interiorly of said magazine through said first opening for cooperation with said film, and for withdrawal to a retracted position in said second opening clearing obstruction of the plane of said guide surface to permit disassembly of said magazine for the projector;

means biasing said reproducing element to the retracted position and linkage means drivingly connected with said reproducing element and normally extending into the assembly path of said magazine for actuation by a complete movement of said magazine to the assembled position, to extend said reproducing element from said second opening through said first opening into the magazine; said linkage means being constructed and arranged to release said reproducing element for retraction by said biasing means upon initial movement of said magazine from the assembled position.

2. A magazine-loaded projector as recited in claim 1, in which said linkage includes a link reciprocably slidable parallel to said guide surface within said second opening therein, said link having an upstanding lip extending into the assembly path of said magazine for interference therewith, whereby insertion of said magazine drives said lip forwardly to drive said reproducing element to the extended position, and withdrawal of said magazine releases said lip for retraction of said reproducing element by said biasing means.

3. A magazine-loaded projector for motion pictures comprising, in combination:

a magazine having the general form of a rectangular parallelepiped, having a plane side surface, and a forward wall and parallel edge surfaces each extending transversely to said side surface; said housing defining an enclosure for an endless coil of film, and having a projection aperture in said forward wall and a first opening in said side surface rearwardly of said forward wall; said forward wall extending continuously between said edge surfaces and enclosing said film against mechanical damage; said magazine further including means for feeding the film past said aperture and entirely interiorly of said housing;

and a projector including a shutter mechanism, an internal projection lamp, and drive means for said film-feeding means; said projector being formed with a plane guide surface terminating at a forward end in abutment means protruding upwardly therefrom; said guide surface terminating laterally in parallel guide channels to receive the edge surfaces of said magazine for rectilinear sliding movement of said magazine longitudinally over said guide surface to and from an assembled position for film projection, in which said forward wall abuts said abutment means;

said guide surface being formed with a second opening aligned with said first opening in the assembled position of said magazine; and a reflector pivotally mounted in said second opening, for advancement to an extended position protruding from said second opening and said guide surface and extending interiorly of said magazine through said first opening for passing light beams from said projection lamp through said projection aperture, and for withdrawal to a retracted position in said second opening clearing obstruction of the plane of said guide surface to permit disassembly of said magazine from the projector;

means biasing said reflector to the retracted position and linkage means drivingly connected with said reflector and normally extending into the assembly path of said magazine for actuation by a complete movement of said magazine to the assembled position, to extend said reflector from said second opening through said first opening into the magazine; said linkage means being constructed and arranged to release said reflector for retraction by said biasing means upon initial movement of said magazine from the assembled position.

4. A magazine-loaded projector as recited in claim 3, together with a sound pick-up head pivotally mounted in an opening in said guide surface of the projector, for advancement to an extended position protruding from said surface and extending through an opening in said side surface interiorly of said magazine for sound reproduction from a track on the film, and for withdrawal to a retracted position within the projector to permit disassembly of said magazine from the projector;

means biasing said pick-up head to the retracted position and further linkage means connected with said pick-up head and normally extending into the assembly path of said magazine for actuation by a complete movement of said magazine to the assembled position, to drive said pick-up head to the extended position in the magazine; said further linkage means being constructed and arranged to release said pick-up head for retraction by said biasing means upon initial movement of said magazine from the assembled position.

References Cited by the Examiner

UNITED STATES PATENTS 3,206,757 9/1965 Schrade _____ 352—78
3,227,508 1/1966 Bavaro _____ 352—720 X JULIA E. COINER, *Primary Examiner.*

NORTON ANSHER, *Examiner.*

V. A. SMITH, *Assistant Examiner.*